United States Patent
Gliner

(10) Patent No.: US 12,502,139 B2
(45) Date of Patent: Dec. 23, 2025

(54) REMOVING NOISE FROM CARDIAC SIGNALS

(71) Applicant: BIOSENSE WEBSTER (ISRAEL) LTD., Yokneam (IL)

(72) Inventor: Vadim Gliner, Haifa (IL)

(73) Assignee: BIOSENSE WEBSTER (ISRAEL) LTD., Yokneam (IL)

( * ) Notice: Subject to any disclaimer, the term of this patent is extended or adjusted under 35 U.S.C. 154(b) by 122 days.

(21) Appl. No.: 17/352,760

(22) Filed: Jun. 21, 2021

(65) Prior Publication Data

US 2022/0061768 A1   Mar. 3, 2022

Related U.S. Application Data

(60) Provisional application No. 63/073,416, filed on Sep. 1, 2020.

(51) Int. Cl.
*A61B 5/00* (2006.01)
*A61B 5/28* (2021.01)
*A61B 5/339* (2021.01)

(52) U.S. Cl.
CPC ............. *A61B 5/7203* (2013.01); *A61B 5/28* (2021.01); *A61B 5/339* (2021.01); *A61B 5/6852* (2013.01); *A61B 5/7267* (2013.01)

(58) Field of Classification Search
CPC ...... A61B 5/7203; A61B 5/367; A61B 5/6852
See application file for complete search history.

(56) References Cited

U.S. PATENT DOCUMENTS

| 5,391,199 | A  | 2/1995  | Ben Haim |
| 6,226,542 | B1 | 5/2001  | Reisfeld |
| 6,239,724 | B1 | 5/2001  | Doron    |
| 6,301,496 | B1 | 10/2001 | Reisfeld |
| 6,332,089 | B1 | 12/2001 | Acker    |

(Continued)

FOREIGN PATENT DOCUMENTS

| CN | 110141215 A * | 8/2019 | ............ A61B 5/316 |
| WO | WO1996005768 A1 | 2/1996 | |
| WO | WO-2019216378 A1 * | 11/2019 | |

OTHER PUBLICATIONS

European Search Report for corresponding EPA No. 21193985.5 dated Jan. 27, 2022.

(Continued)

*Primary Examiner* — Lynsey C Eiseman
*Assistant Examiner* — Laura Hodge
(74) *Attorney, Agent, or Firm* — Clayton, McKay & Bailey, PC

(57) ABSTRACT

In one embodiment, a method includes receiving first cardiac signals captured by at least one first sensing electrode in contact with tissue of a first living subject, injecting the received first cardiac signals into a length of wire, which outputs respective noise-added cardiac signals responsively to noise acquired in the wire, training an artificial neural network to remove noise from cardiac signals responsively to the received first cardiac signals and the respective noise-added cardiac signals, receiving second cardiac signals captured by at least one second sensing electrode in contact with tissue of a second living subject, and applying the trained artificial neural network to the second cardiac signals to yield noise-reduced cardiac signals.

18 Claims, 10 Drawing Sheets

(56) References Cited

U.S. PATENT DOCUMENTS

| | | |
|---|---|---|
| 6,484,118 B1 | 11/2002 | Govari |
| 6,618,612 B1 | 9/2003 | Acker |
| 6,690,963 B2 | 2/2004 | Ben Haim |
| 6,748,255 B2 | 6/2004 | Fuimaono |
| 6,814,733 B2 | 11/2004 | Schwartz |
| 6,892,091 B1 | 5/2005 | Ben Haim |
| 6,997,924 B2 | 2/2006 | Schwartz |
| 7,156,816 B2 | 1/2007 | Schwartz |
| 7,536,218 B2 | 5/2009 | Govari |
| 7,756,576 B2 | 7/2010 | Levin |
| 9,554,718 B2 | 1/2017 | Bar-Tal |
| 11,779,280 B2 | 10/2023 | Van Niekerk et al. |
| 2002/0065455 A1 | 5/2002 | Ben Haim |
| 2003/0120150 A1 | 6/2003 | Govari |
| 2004/0068178 A1 | 4/2004 | Govari |
| 2006/0155334 A1* | 7/2006 | Ideker ............... A61N 1/3956 607/5 |
| 2013/0116577 A1* | 5/2013 | Yazicioglu .......... H01L 27/0811 600/483 |
| 2014/0073875 A1 | 3/2014 | Engelbrecht |
| 2014/0073951 A1 | 3/2014 | Engelbrecht |
| 2014/0278171 A1* | 9/2014 | Kahlke ............... A61B 5/7203 702/75 |
| 2016/0175023 A1 | 6/2016 | Ben Zriham |
| 2018/0249960 A1* | 9/2018 | Gupta ................... A61B 5/291 |
| 2018/0366138 A1* | 12/2018 | Ramprashad ....... G10L 21/0208 |
| 2019/0090774 A1* | 3/2019 | Yang .................... A61B 5/303 |
| 2019/0349310 A1* | 11/2019 | Drakulic .............. A61B 5/316 |
| 2020/0000368 A1* | 1/2020 | Ben-Haim ........... A61B 5/0538 |
| 2020/0205745 A1* | 7/2020 | Khosousi .............. G16H 50/70 |
| 2020/0214618 A1* | 7/2020 | Vullings ................ G16H 50/20 |
| 2021/0218327 A1* | 7/2021 | Huang ................ H02M 1/0009 |

OTHER PUBLICATIONS

Xiong Peng et al., "ECG signal enhancement based on improved denoising auto-encoder", Engineering Applications of Artificial Intelligence, vol. 52, May 6, 2016, pp. 194-202.

Jennifer N. John et al., "Deep Convolutional Neural Networks for Noise Detection in ECGs", Aaarxiv Org, Oct. 5, 2018, abstract.

* cited by examiner

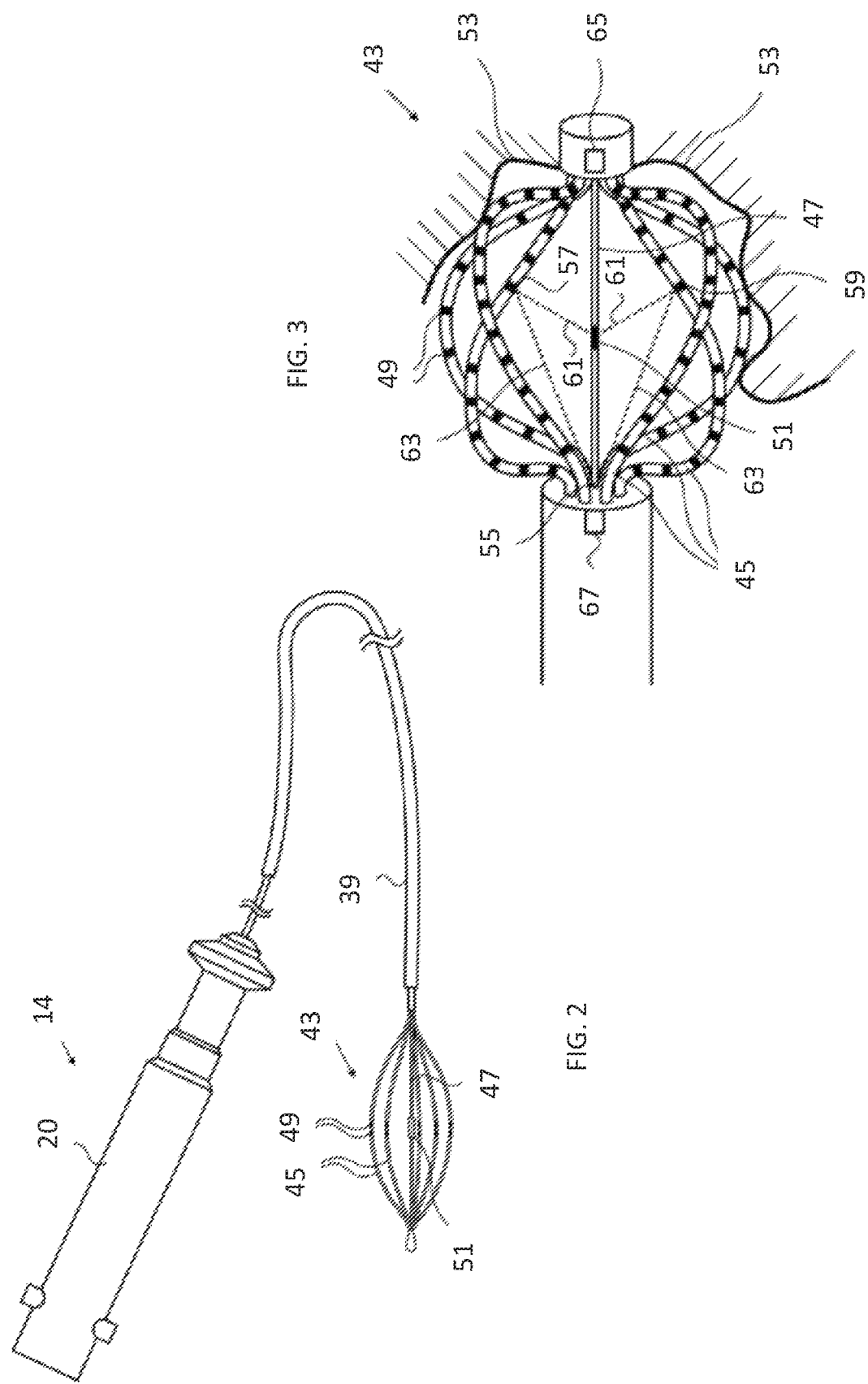

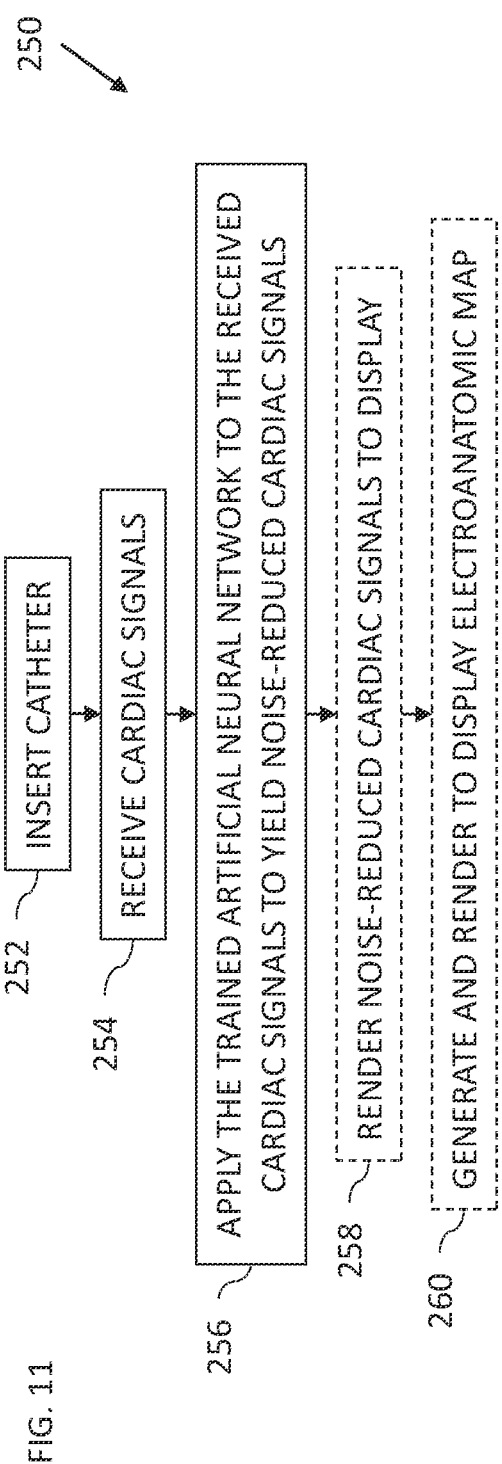
FIG. 11
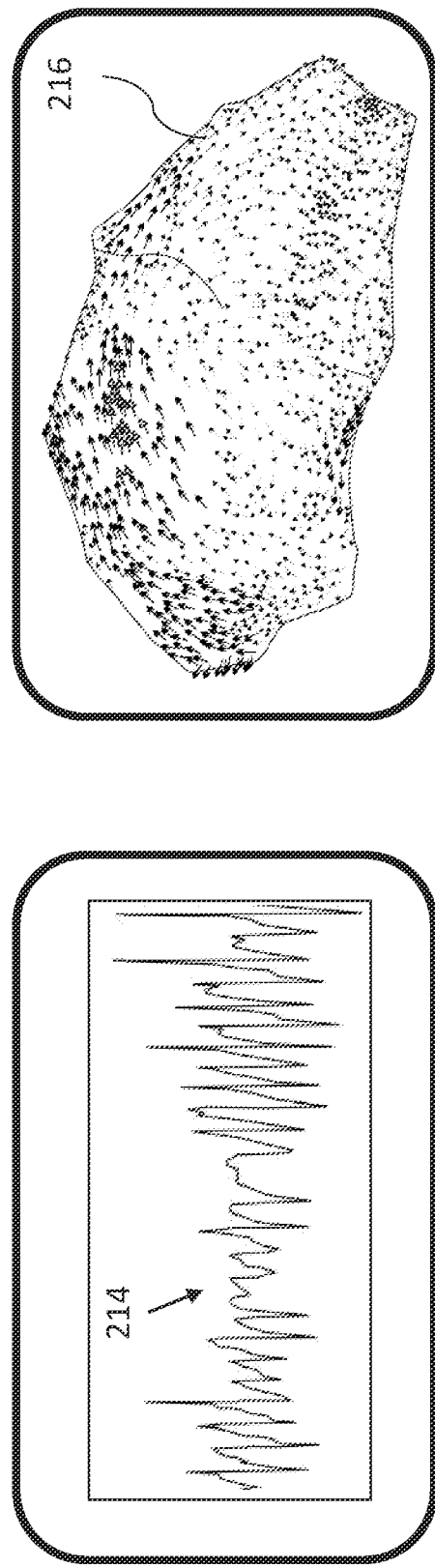
FIG. 13
FIG. 12

REMOVING NOISE FROM CARDIAC SIGNALS

RELATED APPLICATION INFORMATION

The present application claims benefit of U.S. Provisional Patent Application No. 63/073,416, filed 1 Sep. 2020, the disclosure of which is hereby incorporated herein by reference.

FIELD OF THE INVENTION

The present invention relates to medical systems, and in particular, but not exclusively to, processing cardiac signals.

BACKGROUND

A wide range of medical procedures involve placing probes, such as catheters, within a patient's body. Location sensing systems have been developed for tracking such probes. Magnetic location sensing is one of the methods known in the art. In magnetic location sensing, magnetic field generators are typically placed at known locations external to the patient. A magnetic field sensor within the distal end of the probe generates electrical signals in response to these magnetic fields, which are processed to determine the coordinate locations of the distal end of the probe. These methods and systems are described in U.S. Pat. Nos. 5,391,199, 6,690,963, 6,484,118, 6,239,724, 6,618,612 and 6,332,089, in PCT International Publication No. WO 1996/005768, and in U.S. Patent Application Publications Nos. 2002/0065455 and 2003/0120150 and 2004/0068178. Locations may also be tracked using impedance or current based systems.

One medical procedure in which these types of probes or catheters have proved extremely useful is in the treatment of cardiac arrhythmias. Cardiac arrhythmias and atrial fibrillation in particular, persist as common and dangerous medical ailments, especially in the aging population.

Diagnosis and treatment of cardiac arrhythmias include mapping the electrical properties of heart tissue, especially the endocardium, and selectively ablating cardiac tissue by application of energy. Such ablation can cease or modify the propagation of unwanted electrical signals from one portion of the heart to another. The ablation process destroys the unwanted electrical pathways by formation of non-conducting lesions. Various energy delivery modalities have been disclosed for forming lesions, and include use of microwave, laser and more commonly, radiofrequency energies to create conduction blocks along the cardiac tissue wall. In a two-step procedure, mapping followed by ablation, electrical activity at points within the heart is typically sensed and measured by advancing a catheter containing one or more electrical sensors into the heart, and acquiring data at a multiplicity of points. These data are then utilized to select the endocardial target areas at which the ablation is to be performed.

Electrode catheters have been in common use in medical practice for many years. They are used to stimulate and map electrical activity in the heart and to ablate sites of aberrant electrical activity. In use, the electrode catheter is inserted into a major vein or artery, e.g., femoral vein, and then guided into the chamber of the heart of concern. A typical ablation procedure involves the insertion of a catheter having a one or more electrodes at its distal end into a heart chamber. A reference electrode may be provided, generally taped to the skin of the patient or by means of a second catheter that is positioned in or near the heart. RF (radio frequency) current is applied between the catheter electrode (s) of the ablating catheter and an indifferent electrode (which may be one of the catheter electrodes), and current flows through the media between the electrodes, i.e., blood and tissue. The distribution of current may depend on the amount of electrode surface in contact with the tissue as compared to blood, which has a higher conductivity than the tissue. Heating of the tissue occurs due to its electrical resistance. The tissue is heated sufficiently to cause cellular destruction in the cardiac tissue resulting in formation of a lesion within the cardiac tissue which is electrically non-conductive. In some applications, irreversible electroporation may be performed to ablate the tissue.

SUMMARY

There is provided in accordance with another embodiment of the present disclosure, a method for analyzing signals, including receiving first cardiac signals captured by at least one first sensing electrode in contact with tissue of a first living subject, injecting the received first cardiac signals into a length of wire, which outputs respective noise-added cardiac signals responsively to noise acquired in the wire, training an artificial neural network to remove noise from cardiac signals responsively to the received first cardiac signals and the respective noise-added cardiac signals, receiving second cardiac signals captured by at least one second sensing electrode in contact with tissue of a second living subject, and applying the trained artificial neural network to the second cardiac signals to yield noise-reduced cardiac signals.

Further in accordance with an embodiment of the present disclosure the training includes inputting the noise-added cardiac signals into the artificial neural network, and iteratively adjusting parameters of the artificial neural network to reduce a difference between an output of the artificial neural network and the received first cardiac signals.

Still further in accordance with an embodiment of the present disclosure, the method includes converting the first cardiac signals from a digital form to an analog form, the injecting including injecting the first cardiac signals in the analog form into the length of wire, the method further including converting the noise-added cardiac signals to digital form, the training including training the artificial neural network to remove noise from cardiac signals responsively to the received first cardiac signals in digital form and the respective noise-added cardiac signals in digital form.

Additionally, in accordance with an embodiment of the present disclosure the training includes training an autoencoder including an encoder and a decoder.

Moreover, in accordance with an embodiment of the present disclosure, the method includes rendering to a display a representation of at least one of the noise-reduced cardiac signals.

Further in accordance with an embodiment of the present disclosure, the method includes generating and rendering to a display, an electroanatomic map responsively to ones of the noise-reduced cardiac signals.

Still further in accordance with an embodiment of the present disclosure, the method includes inserting a first catheter including the at least one first sensing electrode into a cardiac chamber of the first living subject, and inserting a second catheter including the at least one second sensing electrode into a cardiac chamber of the second living subject.

Additionally, in accordance with an embodiment of the present disclosure the first catheter includes the second catheter.

There is provided in accordance with still another embodiment of the present disclosure, a software product, including a non-transient computer-readable medium in which program instructions are stored, which instructions, when read by a central processing unit (CPU), cause the CPU to receive first cardiac signals captured by at least one first sensing electrode in contact with tissue of a first living subject, inject the received first cardiac signals into a length of wire, which outputs respective noise-added cardiac signals responsively to noise acquired in the wire, train an artificial neural network to remove noise from cardiac signals responsively to the received first cardiac signals and the respective noise-added cardiac signals, receive second cardiac signals captured by at least one second sensing electrode in contact with tissue of a second living subject, and apply the trained artificial neural network to the second cardiac signals to yield noise-reduced cardiac signals.

Further in accordance with an embodiment of the present disclosure, wherein the instructions, when read by the CPU, also cause the CPU to input the noise-added cardiac signals into the artificial neural network, and iteratively adjust parameters of the artificial neural network to reduce a difference between an output of the artificial neural network and the received first cardiac signals.

Still further in accordance with an embodiment of the present disclosure, wherein the instructions, when read by the CPU, also cause the CPU to render to a display a representation of at least one of the noise-reduced cardiac signals.

Additionally, in accordance with an embodiment of the present disclosure, wherein the instructions, when read by the CPU, also cause the CPU to generate and render to a display, an electroanatomic map responsively to ones of the noise-reduced cardiac signals.

There is also provided in accordance with still another embodiment of the present disclosure a medical system, including at least one first sensing electrode configured to contact tissue of a first living subject, processing circuitry, and a length of wire having a first end and a second end, the first and second ends being electrically connected to the processing circuitry, wherein the processing circuitry is configured to receive first cardiac signals captured by the at least one first sensing electrode in contact with the tissue of the first living subject, inject the received first cardiac signals into the first end of the length of the wire, which outputs at the second end respective noise-added cardiac signals responsively to noise acquired in the wire, and train an artificial neural network to remove noise from cardiac signals responsively to the received first cardiac signals and the respective noise-added cardiac signals.

Moreover, in accordance with an embodiment of the present disclosure the artificial neural network includes an autoencoder including an encoder and a decoder, the processing circuitry being configured to train the autoencoder to remove noise from cardiac signals responsively to the received first cardiac signals and the respective noise-added cardiac signals.

Further in accordance with an embodiment of the present disclosure the processing circuitry further includes a digital-to-analog converter configured to convert the first cardiac signals from a digital form to an analog form, the processing circuitry being configured to inject the first cardiac signals in the analog form into the length of wire, and an analog-to-digital converter configured to convert the noise-added cardiac signals to digital form, the processing circuitry being configured to train the artificial neural network to remove noise from cardiac signals responsively to the received first cardiac signals in digital form and the respective noise-added cardiac signals in digital form.

Still further in accordance with an embodiment of the present disclosure the processing circuitry is configured to input the noise-added cardiac signals into the artificial neural network, and iteratively adjust parameters of the artificial neural network to reduce a difference between an output of the artificial neural network and the received first cardiac signals.

Additionally, in accordance with an embodiment of the present disclosure, the system includes at least one second sensing electrode configured to contact tissue of a second living subject, wherein the processing circuitry is configured to receive second cardiac signals captured by the at least one second sensing electrode in contact with the tissue of the second living subject, and apply the trained artificial neural network to the second cardiac signals to yield noise-reduced cardiac signals.

Moreover, in accordance with an embodiment of the present disclosure the trained artificial neural network includes an autoencoder including an encoder and a decoder, the processing circuitry being configured to apply the autoencoder to the second cardiac signals to yield the noise-reduced cardiac signals.

Further in accordance with an embodiment of the present disclosure, the system includes a display, wherein the processing circuitry is configured to render to the display a representation of at least one of the noise-reduced cardiac signals.

Still further in accordance with an embodiment of the present disclosure, the system includes a display, wherein the processing circuitry is configured to generate and render to the display, an electroanatomic map responsively to ones of the noise-reduced cardiac signals.

Additionally, in accordance with an embodiment of the present disclosure, the system includes a first catheter including the at least one first sensing electrode, and configured to be inserted into a cardiac chamber of the first living subject, and a second catheter including the at least one second sensing electrode, and configured to be inserted into a cardiac chamber of the second living subject.

Moreover, in accordance with an embodiment of the present disclosure the first catheter includes the second catheter.

BRIEF DESCRIPTION OF THE DRAWINGS

The present invention will be understood from the following detailed description, taken in conjunction with the drawings in which:

FIG. 2 is a perspective view of a catheter for use with the system of FIG. 1;

FIG. 3 is a detailed schematic view of an electrode assembly for use with the system of FIG. 1;

FIG. 11 is a flowchart including steps in a method to process the captured signal of FIG. 9 using the trained artificial neural network;

FIG. 12 is a schematic view of a displayed cardiac signal; and

FIG. 13 is a schematic view of a displayed electroanatomic map.

DESCRIPTION OF EXAMPLE EMBODIMENTS

Overview

Figure 1:
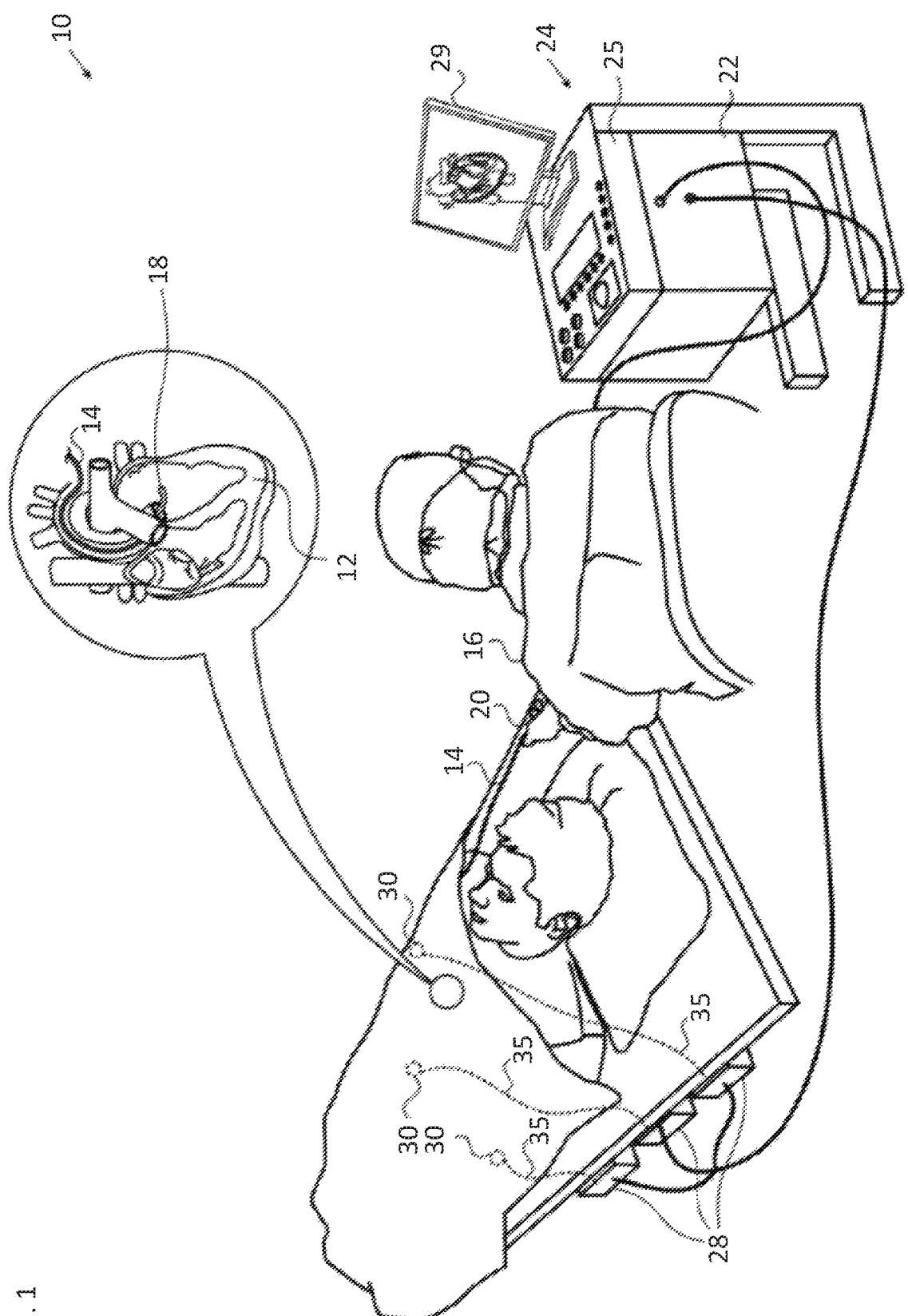
FIG. 1 is a pictorial illustration of a system for performing catheterization procedures on a heart, constructed and operative in accordance with an exemplary embodiment of the present invention.

Noise is added to intracardiac electrogram (IEGM) signals and electrocardiogram (ECG) signals in an electrophysiological (EP) laboratory from equipment in the EP laboratory. For example, as cardiac signals are carried in wires and cables from a catheter and/or body-surface electrodes, the cardiac signals pick up noise generated in the EP laboratory. Each EP laboratory may have its own noise profile based on the equipment operating in the EP laboratory. The noise distorts the IEGM and/or ECG signals and may prevent useful analysis of the signals. Removal of noise from IEGM or ECG signals is not a trivial problem. Noise may share common frequencies with cardiac signals and therefore simply using low-pass, high-pass, or band-pass filters does not provide a satisfactory solution.

The term "cardiac signal", as used in the specification and claims, is defined to include an IEGM signal provided by a catheter electrode in contact with tissue of a cardiac chamber, or an ECG signal provided responsively to one or more body surface electrodes in contact with a skin surface (e.g., of the chest, arms, and/or legs).

Embodiments of the present invention solve the above problems by training an artificial neural network (ANN), such as an autoencoder, to remove noise from cardiac signals based on a set of training signals including cardiac signals and respective noise-added cardiac signals.

Cardiac signals may be captured by one or more catheter electrodes of any suitable catheter and/or from one or more body surface electrodes in contact with a skin surface (e.g., of the chest, arms, and/or legs). The captured cardiac signals are injected into a length of wire, which is exposed to noise in the EP laboratory and outputs respective noise-added cardiac signals responsively to noise acquired in the wire from the noise in the EP laboratory.

The ANN may be trained by inputting the noise-added cardiac signals into the ANN. Using an iterative process, parameters of the ANN are iteratively updated to reduce the difference between the actual output of the ANN and the desired output (e.g., the captured cardiac signals (prior to the noise being added in the wire).

Once trained, the ANN may be applied to any suitable IEGM or ECG signals captured by any suitable electrode(s) to clean noise from the captured signals. The trained ANN may be applied to remove noise from cardiac signals captured from the same catheter (or body surface electrodes) as used to provide the training signals or from a different catheter (or body surface electrodes). The trained ANN may be applied to remove noise from cardiac signals captured from the same living subject, which provided the training data, or from a different living subject.

The ANN may be trained prior to, and/or during, an EP procedure so that when sufficient cardiac signals have been captured, the ANN is trained responsively to the captured data. The trained ANN may continue to be trained as the EP procedure progresses based on addition captured cardiac signals possibly improving the noise removal properties of the ANN.

In some embodiments, the weights of the ANN may be sent to a cloud server in which the ANN may execute to remove noise from cardiac signals sent to the server.

System Description

Reference is now made to FIG. 1, which is a pictorial illustration of a medical system 10 for performing catheterization procedures on a heart 12, constructed and operative in accordance with an embodiment of the present invention. The medical system 10 may be configured to evaluate electrical activity and perform ablative procedures on the heart 12 of a living subject. The system comprises a catheter 14, which is percutaneously inserted by an operator 16 through the patient's vascular system into a chamber or vascular structure of the heart 12. The operator 16, who is typically a physician, brings the catheter's distal end 18 into contact with the heart wall, for example, at an ablation target site. Electrical activation maps may be prepared, according to the methods disclosed in U.S. Pat. Nos. 6,226,542, 6,301,496, and 6,892,091. One commercial product embodying elements of the system 10 is available as the CARTO® 3 System, available from Biosense Webster, Inc., Irvine, CA. This system may be modified by those skilled in the art to embody the principles of the invention described herein.

Areas determined to be abnormal, for example by evaluation of the electrical activation maps, can be ablated by application of thermal energy, e.g., by passage of radiofrequency electrical current through wires in the catheter to one or more electrodes at the distal end 18, which apply the radiofrequency energy to the myocardium. The energy is absorbed in the tissue, heating it to a point at which it permanently loses its electrical excitability. When successful, this procedure creates non-conducting lesions in the cardiac tissue, which disrupt the abnormal electrical pathway causing the arrhythmia. The principles of the invention can be applied to different heart chambers to diagnose and treat many different cardiac arrhythmias.

The catheter 14 typically comprises a handle 20, having suitable controls on the handle to enable the operator 16 to steer, position and orient the distal end 18 of the catheter 14 as desired for the ablation. To aid the operator 16, a distal portion of the catheter 14 contains position sensors (not shown) that provide signals to processing circuitry 22, located in a console 24. The processing circuitry 22 may fulfill several processing functions as described below.

Wire connections 35 may link the console 24 with body surface electrodes 30 and other components of a positioning sub-system for measuring location and orientation coordinates of the catheter 14. The processing circuitry 22 or another processor (not shown) may be an element of the positioning subsystem. Catheter electrodes (not shown) and the body surface electrodes 30 may be used to measure tissue impedance at the ablation site as taught in U.S. Pat. No. 7,536,218. Temperature sensors (not shown), typically a thermocouple or thermistor, may be mounted on ablation surfaces on the distal portion of the catheter 14 as described below.

The console 24 typically contains one or more ablation power generators 25. The catheter 14 may be adapted to conduct ablative energy to the heart using any known ablation technique, e.g., radiofrequency energy, ultra-sound energy, irreversible electroporation and laser-produced light energy. Such methods are disclosed in U.S. Pat. Nos. 6,814,733, 6,997,924, and 7,156,816.

In one embodiment, the positioning subsystem comprises a magnetic position tracking arrangement that determines the position and orientation of the catheter 14 by generating magnetic fields in a predefined working volume and sensing these fields at the catheter, using field generating coils 28. The positioning subsystem is described in U.S. Pat. Nos. 7,756,576, and 7,536,218.

As noted above, the catheter 14 is coupled to the console 24, which enables the operator 16 to observe and regulate the functions of the catheter 14. Console 24 includes the processing circuitry 22, generally a computer with appropriate signal processing circuits. The processing circuitry 22 is coupled to drive a display 29 (e.g., a monitor). The signal processing circuits typically receive, amplify, filter and digitize signals from the catheter 14, including signals generated by sensors such as electrical, temperature and contact force sensors, and a plurality of location sensing electrodes (not shown) located distally in the catheter 14. The digitized signals are received and used by the console 24 and the positioning system to compute the position and orientation of the catheter 14, and to analyze the electrical signals from the electrodes.

In order to generate electroanatomic maps, the processing circuitry 22 typically comprises a mapping module including an electroanatomic map generator, an image registration program, an image or data analysis program and a graphical user interface configured to present graphical information on the display 29.

Typically, the system 10 includes other elements, which are not shown in the figures for the sake of simplicity. For example, the system 10 may include an electrocardiogram (ECG) monitor, coupled to receive signals from one or more body surface electrodes, in order to provide an ECG synchronization signal to the console 24. As mentioned above, the system 10 typically also includes a reference position sensor, either on an externally-applied reference patch attached to the exterior of the subject's body, or on an internally-placed catheter, which is inserted into the heart 12 maintained in a fixed position relative to the heart 12. Conventional pumps and lines for circulating liquids through the catheter 14 for cooling the ablation site may be provided. The system 10 may receive image data from an external imaging modality, such as an MRI unit or the like and includes image processors that can be incorporated in or invoked by the processing circuitry 22 for generating and displaying images.

In practice, some or all of the functions of the processing circuitry 22 may be combined in a single physical component or, alternatively, implemented using multiple physical components. These physical components may comprise hard-wired or programmable devices, or a combination of the two. In some embodiments, at least some of the functions of the processing circuitry 22 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

Reference is now made to FIG. 2, which is a perspective view of the catheter 14 for use with the system 10 of FIG. 1.

The catheter 14 comprises an elongated shaft 39 having proximal and distal ends, the control handle 20 at the proximal end of the catheter body, and an expandable distal end basket assembly 43 mounted at the distal end of the shaft 39.

The shaft 39 comprises an elongated tubular construction having a single, axial or central lumen (not shown), but can optionally have multiple lumens if desired. The shaft 39 is flexible, i.e., bendable, but substantially non-compressible along its length. The shaft 39 can be of any suitable construction and made of any suitable material. In some embodiments, the elongated shaft 39 comprises an outer wall made of polyurethane or polyether block amide. The outer wall comprises an imbedded braided mesh of stainless steel or the like to increase torsional stiffness of the shaft 39 so that, when the control handle 20 is rotated, the distal end of the shaft 39 rotates in a corresponding manner.

The outer diameter of the shaft 39 is not critical, but may be in the range of about 2 to 5 mm. Likewise, the thickness of the outer wall is not critical, but is generally thin enough so that the central lumen can accommodate any one or more of the following: a puller wire, lead wires, sensor cables and any other wires, cables or tubes. If desired, the inner surface of the outer wall is lined with a stiffening tube (not shown) to provide improved torsional stability. An example of a catheter body construction suitable for use in connection with the present invention is described and depicted in U.S. Pat. No. 6,064,905.

The assembly 43 is mounted to the distal end of the shaft 39. As shown in FIG. 2, the basket assembly 43 comprises five splines 45 or arms mounted, generally evenly-spaced, around a contraction wire 47, which is connected to the distal extremity of the assembly 43, and which contracts, retracts and expands the assembly 43 when a tractive or a pushing force is applied longitudinally to the contraction wire 47 as the case may be. The contraction wire 47 forms a longitudinal axis of symmetry for the assembly 43. The splines 45 are all attached, directly or indirectly, to the contraction wire 47 at their distal ends, and to the shaft 39 at their proximal ends. When the contraction wire 47 is moved longitudinally to expand and contract the assembly 43, in the expanded position the splines 45 are bowed outwardly and in the contracted position the splines 45 are generally straight. As will be recognized by one skilled in the art, the number of splines 45 can vary as desired depending on the particular application, so that the assembly 43 has at least two splines, generally at least three splines, and as many as ten or more splines. The expandable distal end basket assembly 43 is not limited to the depicted configuration, but can include other designs, such as spherical or egg-shaped designs, that include a plurality of expandable arms connected, directly or indirectly, at their proximal and distal ends. In other embodiments, the basket assembly may be replaced by any suitable distal end assembly, for example, a balloon assembly, a focal catheter assembly, a flat grid assembly, or a multiple spline assembly.

The assembly 43 includes at least one sensing electrode 49 disposed thereon. In some embodiments, each of the splines 45 may comprise a flexible wire with a non-conductive covering on which one or more of the sensing electrodes 49 (e.g., ring spline electrodes) are mounted. The electrodes 49 are termed as "sensing electrodes" for the sake of convenience, but may also be used to perform ablation. In some embodiments, the flexible wires each comprise a flat nitinol wire and the non-conductive coverings each comprise a biocompatible plastic tubing, such as polyurethane or polyimide tubing. Alternatively, the splines 45 can be designed without the internal flexible wire if a sufficiently rigid nonconductive material is used for the non-conductive covering to permit expansion of the assembly 43, so long as the spline has an outer surface that is non-conductive over at least a part of its surface for mounting of the sensing electrodes 49. In some embodiments, the splines may be formed from flexible polymer strip circuits with electrodes 49 being disposed on an outer surface of each of the flexible polymer strip circuits.

Each of the sensing electrodes 49 on the splines 45 is electrically connected to an appropriate mapping or monitoring system and/or source of ablation energy by means of an electrode lead wire (not shown). The electrode lead wires extend through the control handle 20, through a lumen in the shaft 39, into the non-conductive covering of corresponding splines 45, and attach to their corresponding sensing electrodes 49 by any suitable method. The catheter 14 optionally includes a far-field electrode 51, e.g., a cylindrical electrode, disposed on the contraction wire 47. The far-field electrode 51 is disposed in the expandable distal end basket assembly 43 to prevent the far-field electrode 51 from contacting the tissue of the cardiac chamber of the heart 12. The function of the far-field electrode 51 is described below with reference to FIG. 3. Additional details of the catheter 14 are described in the above-referenced U.S. Pat. No. 6,748,255. The catheter 14 typically has multiple sensing electrodes 49 arranged on multiple flexible splines of the basket assembly 43. The catheter 14 is configured to be inserted into a cardiac chamber of the heart 12 (FIG. 1) of the living subject in a collapsed form, where the splines 45 are relatively close together. One or more of the sensing electrodes 49 are configured to make contact with tissue of the living subject. Once in the heart 12, the splines 45 may be formed into their expanded basket shape by the contraction wire 47, which holds distal ends of the splines 45, and pulls the distal ends of the splines 45 in a proximal direction.

Reference is now made to FIG. 3, which is a detailed schematic view of the expandable distal end basket assembly 43 of FIG. 2. In expanded form of the assembly 43 at least a portion of the sensing electrodes 49 of the splines 45 contact endocardial surface 53 of the heart 12 and acquire signals corresponding to electropotentials generated at their points of contact with the surface. However, since the sensing electrodes 49 are in a conductive medium (the blood), in addition to the electropotentials from the points of contact, the acquired signals also include far-field components from other regions of the heart 12.

The far-field components constitute an interfering signal on the endocardial surface electropotentials. To counteract the interference, some embodiments position the far-field electrode 51 on the contraction wire 47. In the expanded configuration of the assembly 43, the far-field electrode 51 is located on the contraction wire 47 so as to be approximately equidistant from all corresponding sensing electrodes 49, i.e., sensing electrodes 49 that are equidistant from a fixed reference point on the long axis of the catheter, such as reference point 55 at the proximal end of the assembly 43, and is prevented from contacting the surface of the heart by the splines 45. For example, electrodes 57, 59 are equidistant from reference point 55, and are also equidistant from the far-field electrode 51, as indicated by broken lines 61, 63, respectively. When the far-field electrode 51 is at least 0.5 cm removed from the sensing electrodes 49 in the expanded configuration of the assembly 43 it acquires a far-field signal, but not a near-field signal from the endocardial surface 53. However, the signals e(t) acquired by the sensing electrodes 49 may have both a far-field and a surface (near-field) component. The far-field component signal x(t) acquired by the far-field electrode 51 may be removed from the signals e(t) acquired by the sensing electrodes 49 so as to counteract the interference suffered by these electrodes, i.e., by subtraction of the signals: e(t)−x(t). Additionally, or alternatively, removal of the far-field component may be accomplished using any suitable method, such as the algorithms described in US Patent Publication No. 2016/0175023, or U.S. Pat. No. 9,554,718. In some embodiments, the far-field components of the signals captured by the sensing electrodes 49 are not removed.

In some embodiments, the catheter 14 is provided with a distal location sensor 65 mounted at or near the position where the distal ends of the splines are connected, and a proximal location sensor 67 mounted at or near the proximal end of the assembly 43, whereby, in use, the co-ordinates of the location sensor 65 relative to those of the location sensor 67 can be determined and taken together with known information pertaining to the curvature of the splines 45 to find the positions of each of the sensing electrodes 49.

Figure 4:
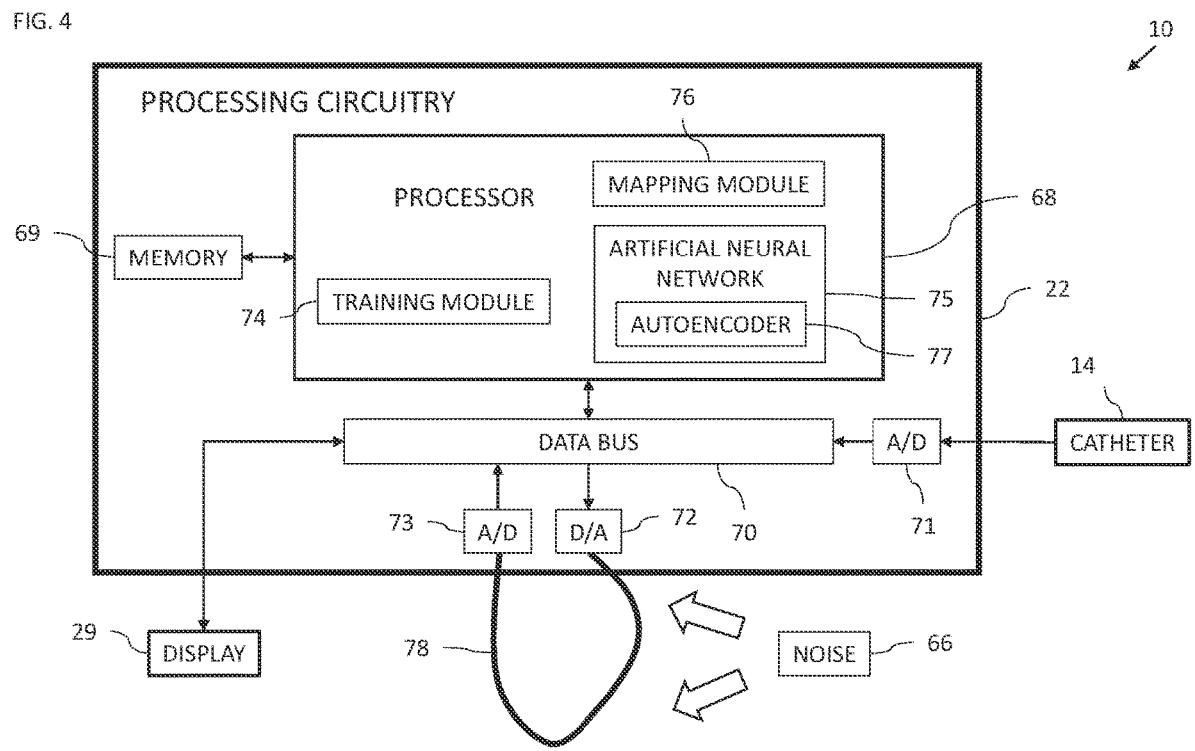
FIG. 4 is a more detailed view of processing circuitry in the system of FIG. 1.
Figure 5:
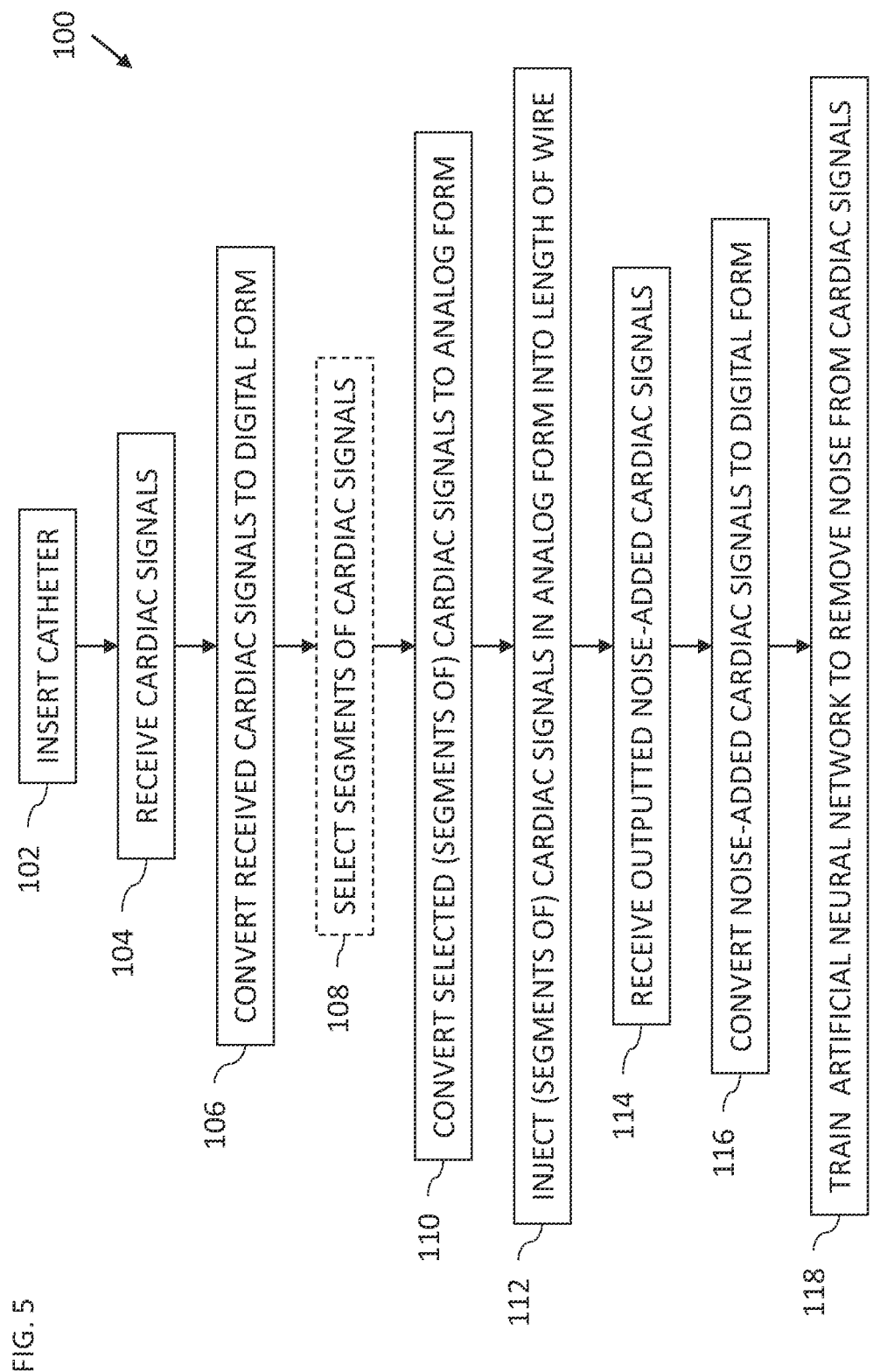
FIG. 5 is a flowchart including steps in a method of operation of the system of FIG. 1.

Reference is now made to FIGS. 4 and 5. FIG. 4 is a more detailed view of the processing circuitry 22 in the system 10 of FIG. 1. FIG. 5 is a flowchart 100 including steps in a method of operation of the system 10 of FIG. 1.

The processing circuitry 22 includes a processor 68, a memory 69, a data bus 70, an analog-to-digital convertor 71, a digital-to-analog convertor 72, an analog-to-digital convertor 73. In some embodiments, the analog-to-digital convertor 71 and analog-to-digital convertor 73 may be implemented in a single multichannel analog-to-digital convertor.

The processor 68 is configured to run software to perform various signal processing and computation tasks, including a training module 74, an artificial neural network 75, and a mapping module 76. The training module 74 is configured to train the artificial neural network 75 as described in more detail below with reference to FIGS. 6-8. The artificial neural network 75 may include an autoencoder 77 described in more detail with reference to FIG. 6. The mapping module 76 is configured to generate and render EP maps responsively to cardiac signals and other data captured from a living subject as described in more detail with reference to FIG. 13. In some embodiments, one or more functions performed by the processor 68 may be performed by hard-wired processing circuitry.

The memory 69 is configured to store data used by the processor 68. The data bus 70 is configured to transfer data between the various elements of the processing circuitry 22 for example, between the processor 68 and the analog-to-digital convertor 71, digital-to-analog convertor 72, and/or analog-to-digital convertor 73 and to interfaces such as to an interface (not shown) to the display 29.

The medical system 10 includes a length of wire 78. The ends of the length of wire 78 are electrically connected to the processing circuitry 22 via the digital-to-analog convertor 72 and the analog-to-digital convertor 73, as described in more detail below. The length of wire 78 is exposed to noise 66 in the EP laboratory and therefore signals injected into the length of wire 78 become noisier due to the incident noise 66.

The artificial neural network 75 is trained based on data captured from: a catheter such as the catheter 14 of FIGS. 1-3, which is inserted (block 102) into a cardiac chamber of the living subject; and/or from body surface electrodes 30

(FIG. 1) applied to the skin of the living subject, and noise picked up in the length of wire 78 from the noise 66 in the EP laboratory, as described in more detail below. For example, the electrodes 49 (FIG. 3) of the catheter 14 are in contact with the tissue (e.g., endocardial surface 53 (FIG. 3) of the chamber of the heart 12 (FIG. 1) and provide cardiac signals which include some noise acquired in the elongated shaft 39 (FIG. 2) of the catheter 14. In order to provide high quality training data, the operator 16 generally confirms that there is a good quality of contact between the tissue of the living subject and the electrodes 49 (and/or body surface electrodes 30) providing the cardiac signals.

The processing circuitry 22 (FIG. 1) is configured to receive (block 104) cardiac signals captured by one or more of the electrodes 49 (and/or one or more of the body surface electrodes 30) in contact with tissue of the living subject. The catheter 14 may provide signals from different electrodes 49 while in a given position within the cardiac chamber and/or from one or more electrodes 49 while the catheter 14 is moved to different positions in the cardiac chamber. The cardiac signals may be provided from different cardiac chambers and even from different living subjects.

The processor 68 of the processing circuitry 22 is configured to receive the cardiac signals from the sensing electrodes 49 of the catheter 14 and/or from the body surface electrodes 30 via the analog-to-digital convertor 71, which is configured to convert (block 106) the cardiac signals from analog form to digital form.

In some embodiments, the training module 74 running on the processor 68 of the processing circuitry 22 is optionally configured to select (block 108) segments of the received cardiac signals for use as training data. In some embodiments, the training module 74 may segment the received cardiac signals with one or more sections of the received cardiac signals being discarded. In other embodiments, the training module 74 may segment the received cardiac signals by adding markers to the cardiac signals in order to identify the segments used as training data.

The training module 74 running on the processor 68 is configured to inject (segments of) the received cardiac signals into the length of wire 78 via the digital-to-analog convertor 72, which is configured to convert (block 110) the (segments of) the received cardiac signals from a digital form to an analog form. Therefore, the processor 68 of the processing circuitry 22 is configured to inject (block 112) (the segments of) the received cardiac signals in analog form into one end of the length of wire 78, which outputs at the other end of the length of wire 78 respective noise-added cardiac signals responsively to noise acquired in the wire 78. For example, noise is added to a cardiac signal A yielding a cardiac signal A', and noise is added to a cardiac signal B yielding a cardiac signal B'.

The analog-to-digital convertor 73 is configured to receive (block 114) the noise-added cardiac signals outputted from the length of wire 78 and convert (block 116) the noise-added cardiac signals from analog to digital form.

The noise-added cardiac signals are received by the training module 74 running on the processor 68. The training module 74 running on the processor 68 of the processing circuitry 22 is configured to train (block 118) the artificial neural network 75 (e.g., the autoencoder 77) to remove noise from cardiac signals. The step of block 118 is described in more detail with reference to FIGS. 6-8.

Figure 6:
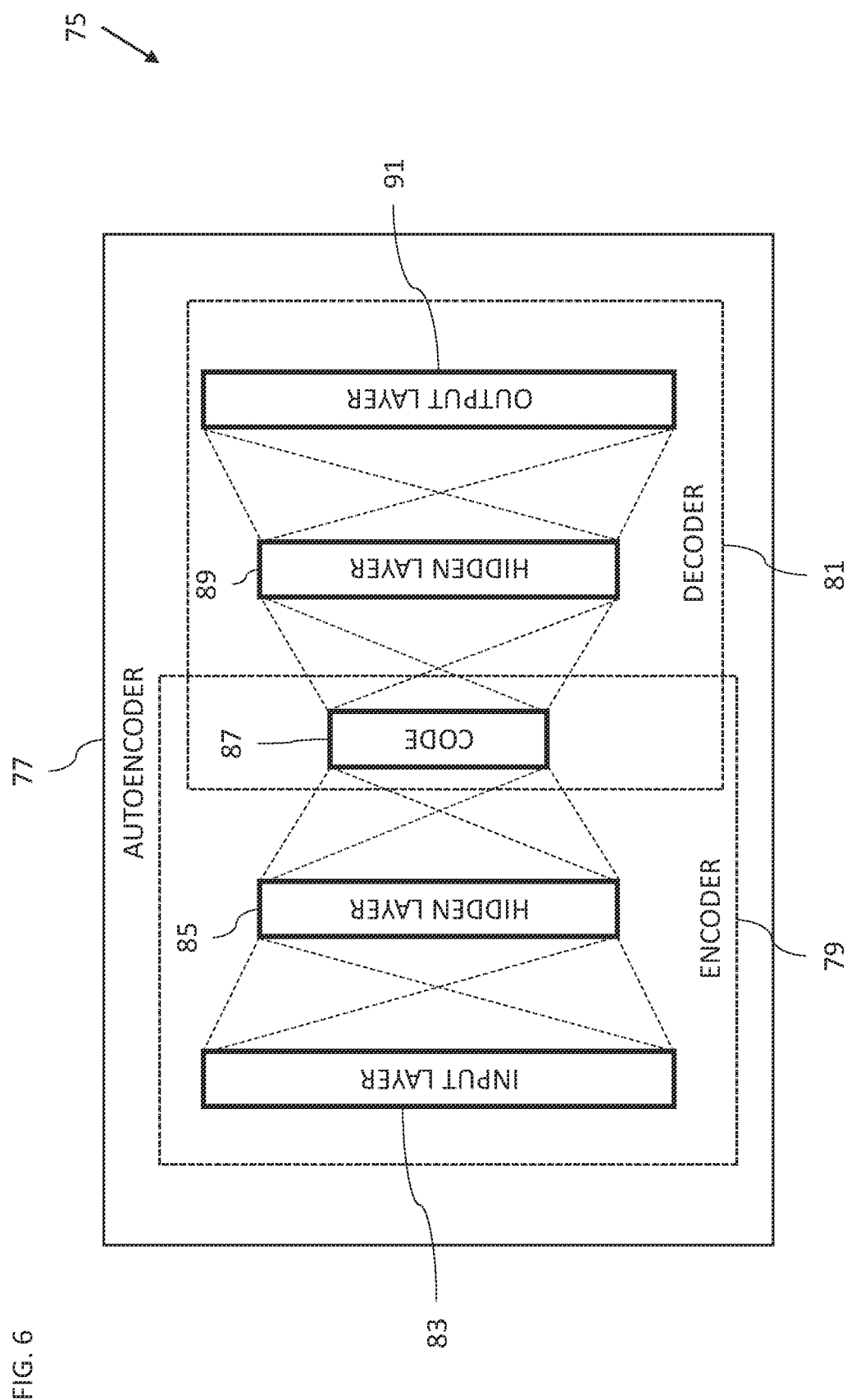
FIG. 6 is a schematic view of an artificial neural network for use with the system of FIG. 1.

Reference is now made to FIG. 6, which is a schematic view of the artificial neural network 75 for use with the system 10 of FIG. 1.

A neural network is a network or circuit of neurons, or in a modern sense, an artificial neural network, composed of artificial neurons or nodes. The connections of the biological neuron are modeled as weights. A positive weight reflects an excitatory connection, while negative values mean inhibitory connections. Inputs are modified by a weight and summed using a linear combination. An activation function may control the amplitude of the output. For example, an acceptable range of output is usually between 0 and 1, or it could be −1 and 1.

These artificial networks may be used for predictive modeling, adaptive control and applications and can be trained via a dataset. Self-learning resulting from experience can occur within networks, which can derive conclusions from a complex and seemingly unrelated set of information.

For completeness, a biological neural network is composed of a group or groups of chemically connected or functionally associated neurons. A single neuron may be connected to many other neurons and the total number of neurons and connections in a network may be extensive. Connections, called synapses, are usually formed from axons to dendrites, though dendrodendritic synapses and other connections are possible. Apart from the electrical signaling, there are other forms of signaling that arise from neurotransmitter diffusion.

Artificial intelligence, cognitive modeling, and neural networks are information processing paradigms inspired by the way biological neural systems process data. Artificial intelligence and cognitive modeling try to simulate some properties of biological neural networks. In the artificial intelligence field, artificial neural networks have been applied successfully to speech recognition, image analysis and adaptive control, in order to construct software agents (in computer and video games) or autonomous robots.

A neural network (NN), in the case of artificial neurons called artificial neural network (ANN) or simulated neural network (SNN), is an interconnected group of natural or artificial neurons that uses a mathematical or computational model for information processing based on a connectionistic approach to computation. In most cases an ANN is an adaptive system that changes its structure based on external or internal information that flows through the network. In more practical terms, neural networks are non-linear statistical data modeling or decision-making tools. They can be used to model complex relationships between inputs and outputs or to find patterns in data.

In some embodiments, as shown in FIG. 6, the artificial neural network 75 may include the autoencoder 77 including an encoder 79 and a decoder 81. In other embodiments, the artificial neural network 75 may comprise any suitable ANN. The artificial neural network 75 may comprise software executed by the processor 68 of the processing circuitry 22 (FIG. 4) and/or hardware modules configured to perform the functions of the artificial neural network 75.

The encoder 79 includes an input layer 83 into which an input is received. The encoder then includes one or more hidden layers 85 which progressively compress the input to a code 87. The decoder 81 includes one or more hidden layers 89 which progressively decompress the code 87 up to an output layer 91 from which the output of the autoencoder 77 is provided. The autoencoder 77 includes weights between the layers of the autoencoder 77. The autoencoder 77 manipulates the data received at the input layer 83 according to the values of the various weights between the layers of the autoencoder 77.

The weights of the autoencoder 77 are updated during training of the autoencoder 77 so that the autoencoder 77 performs a data manipulation task that the autoencoder 77 is trained to perform. In the example of FIG. 6, the autoencoder 77 is trained to remove noise from cardiac signals as described in more detail with reference to FIGS. 7 and 8.

The number of layers in the autoencoder 77 and the width of the layers may be configurable. As the number of layers and width of the layers increases so does the accuracy to which the autoencoder 77 can manipulate data according to the task at hand. However, a larger number of layers, and wider layers, generally requires more training data, more training time and the training may not converge. By way of example, the input layer 83 may include 400 neurons (e.g., to compress a batch of 400 samples). The encoder 79 may include five layers which compress by a factor of two (e.g., 400, 200, 100, 50, 25). The decoder may include five layers which decompress by a factor of 2 (e.g., 25, 50, 100, 200, 400).

Figure 7:
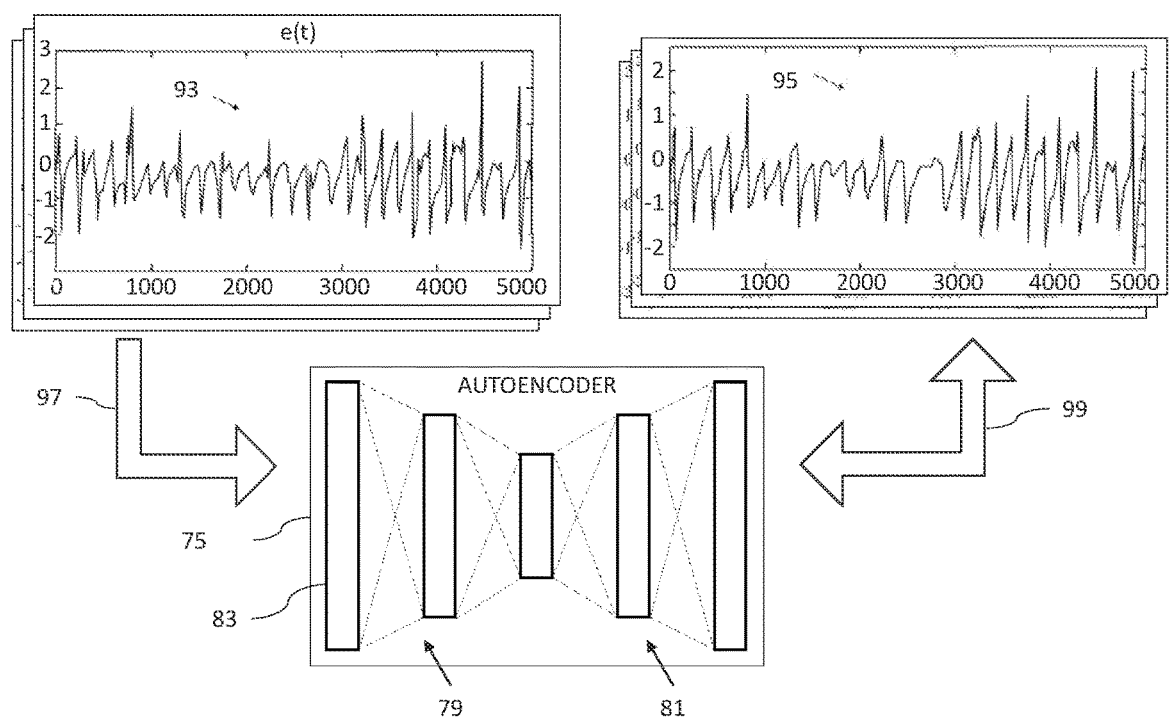
FIG. 7 is a schematic view illustrating training of the artificial neural network of FIG. 6.
Figure 8:
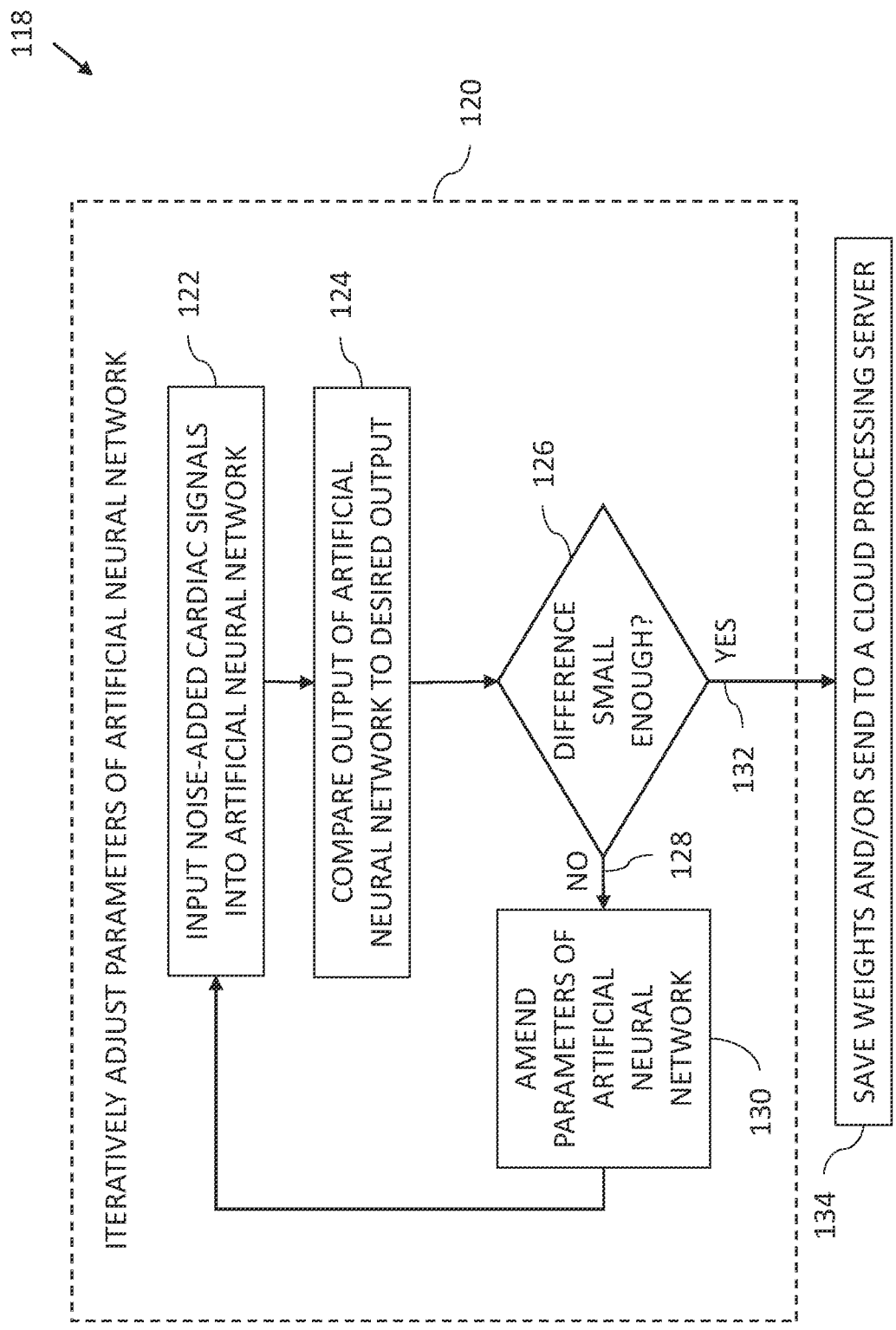
FIG. 8 is a flowchart including sub-steps in a step of the method of FIG. 5.

Reference is now made to FIGS. 7 and 8. FIG. 7 is a schematic view illustrating training of the artificial neural network 75 of FIG. 6. FIG. 8 is a flowchart including sub-steps in the step of block 118 of FIG. 5.

The processing circuitry 22 (FIG. 4) is configured to train the artificial neural network 75 (e.g., the autoencoder 77) to remove noise from cardiac signals responsively to (the segments of) the received cardiac signals (graphs 95) (in digital form) and respective noise-added cardiac signals (graphs 93) (in digital form).

Training the artificial neural network 75 is generally an iterative process. One method of training the artificial neural network 75 is now described below. The training module 74 of the processor 68 of the processing circuitry 22 (FIG. 4) is configured to iteratively adjust (block 120) parameters of the artificial neural network 75 to reduce a difference between an output of the artificial neural network 75 and (the segments of) the received cardiac signals.

Sub-steps of the step of block 120 are now described below.

The training module 74 running on the processor 68 of the processing circuitry 22 (FIG. 4) is configured to input (block 122, arrow 97) the noise-added cardiac signals (graphs 93) into the artificial neural network 75. For example, the noise-added cardiac signals are input into the input layer 83 of the encoder 79. The training module 74 running on the processor 68 of the processing circuitry 22 (FIG. 4) is configured to compare (block 124, arrow 99) the output of the artificial neural network 75 (e.g., the output of the decoder 81 of the autoencoder 77) with the desired output, i.e., the corresponding (segments of) the received cardiac signals (graphs 95). For example, if there is a set of intracardiac signals A, B, C output by the artificial neural network 75 and a corresponding set of (segments of) the received intracardiac signals A', B', and C', the training module 74 of the processor 68 of the processing circuitry 22 (FIG. 4) compares A with A', B with B', C with C' and so on. The comparison is generally performed using a suitable loss function, which computes the overall difference between all the outputs of the artificial neural network 75 and all the desired outputs (e.g., all the corresponding (segments of the) received intracardiac signals (graphs 95)).

At a decision block 126, the training module 74 running on the processor 68 of the processing circuitry 22 (FIG. 4) is configured to determine if the difference between the output of the artificial neural network 75 and desired output is small enough. If the difference between the output of the artificial neural network 75 and the desired output is small enough (branch 132), the training module 74 running on the processor 68 of the processing circuitry 22 (FIG. 4) is configured to save (block 134) the parameters (e.g., weights) of the artificial neural network 75 (e.g., the autoencoder 77) and/or send the parameters (e.g., weights) to a cloud processing server (not shown).

If the difference is not small enough (branch 128), the training module 74 running on the processor 68 of the processing circuitry 22 (FIG. 4) is configured to amend (block 130) parameters (e.g., weights) of the artificial neural network 75 (e.g., of the autoencoder 77) to reduce the difference between the output of the artificial neural network 75 and the desired output of the artificial neural network 75. The difference being minimized in the above example is the overall difference between all the outputs of the artificial neural network 75 and all the desired outputs (e.g., all the (segments of the) received intracardiac signals (graphs 95). The training module 74 running on the processor 68 of the processing circuitry 22 (FIG. 4) is configured to amend the parameters using any suitable optimization algorithm, for example, a gradient descent algorithm such as Adam Optimization. The steps of blocks 122-126 are then repeated.

Figure 9:
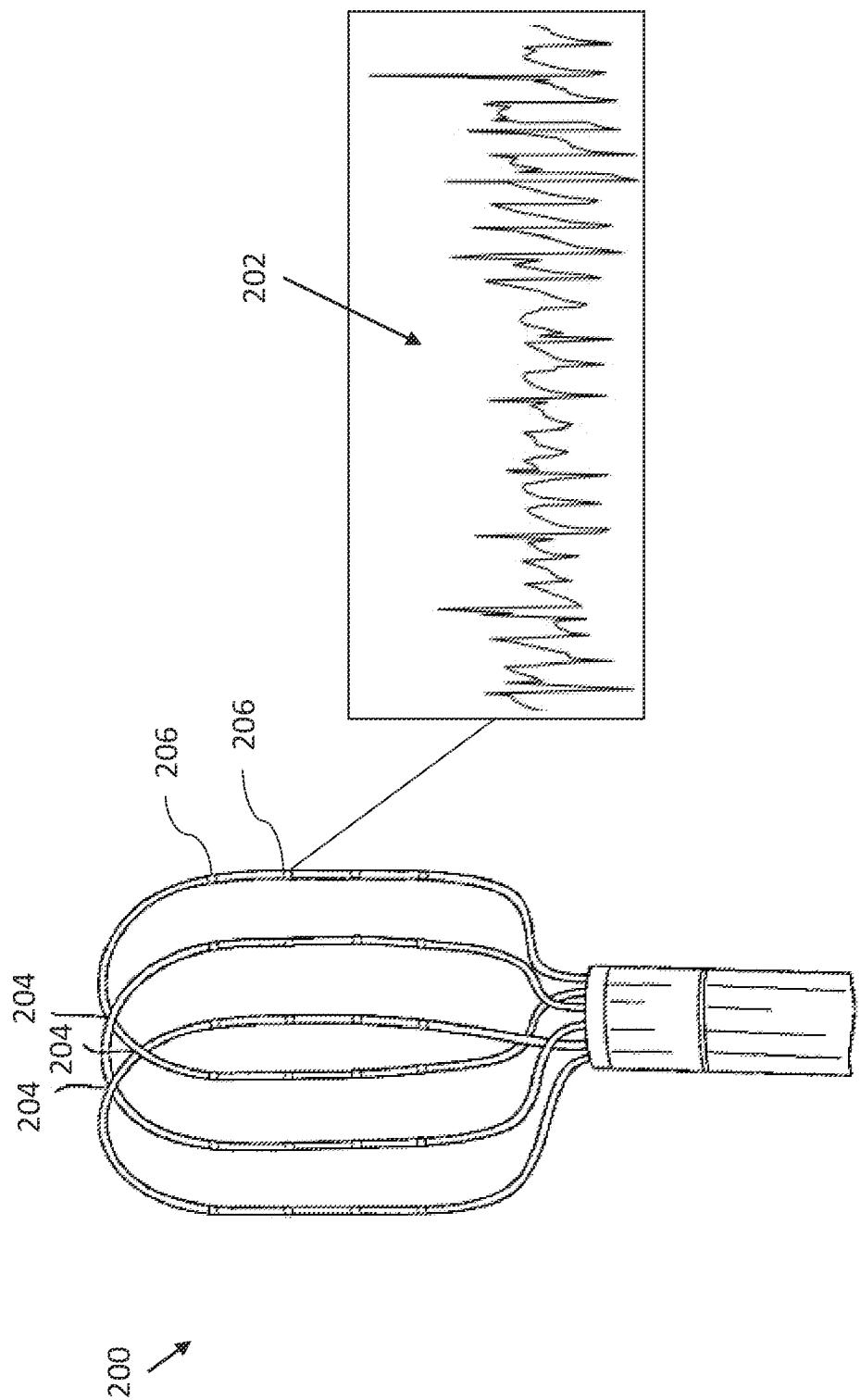
FIG. 9 is a schematic view of a catheter and a signal captured by the catheter for use in the system of FIG. 1.

Reference is now made to FIG. 9, which is a schematic view of a catheter 200 and a cardiac signal 202 captured by the catheter 200 for use in the system 10 of FIG. 1. The catheter 200 is a flat grid catheter including multiple splines 204 with electrodes 206 (only some labeled for the sake of simplicity) on each spline 204. The catheter 200 is configured to be inserted into a cardiac chamber of a living subject, with one or more of the electrodes 206 being configured to contact tissue of the living subject. The living subject may be: the same living subject into which the catheter 14 was inserted and according to which the artificial neural network 75 was trained; or a different living subject.

The medical system 10 is configured to remove noise from the cardiac signal 202 using the trained artificial neural network 75 (FIG. 7) as described in more detail with reference to FIGS. 10 and 11 below.

The catheter 200 is an example of a catheter which provides a cardiac signal including noise to be removed. Any suitable catheter (e.g., a balloon, basket, or focal catheter), may provide a cardiac signal which is then processed using the trained artificial neural network 75 to remove noise from the provided cardiac signal. In some embodiments, the catheter 14 may be used to provide cardiac signals including noise to be removed. In other words, the same catheter which trains the artificial neural network 75 may provide cardiac signals including noise to be removed by the artificial neural network 75.

Similarly, one or more cardiac signals provided by one or more body surface electrodes 30 (FIG. 1) may be processed by the artificial neural network 75 to remove noise from the provided cardiac signal(s).

Figure 10:
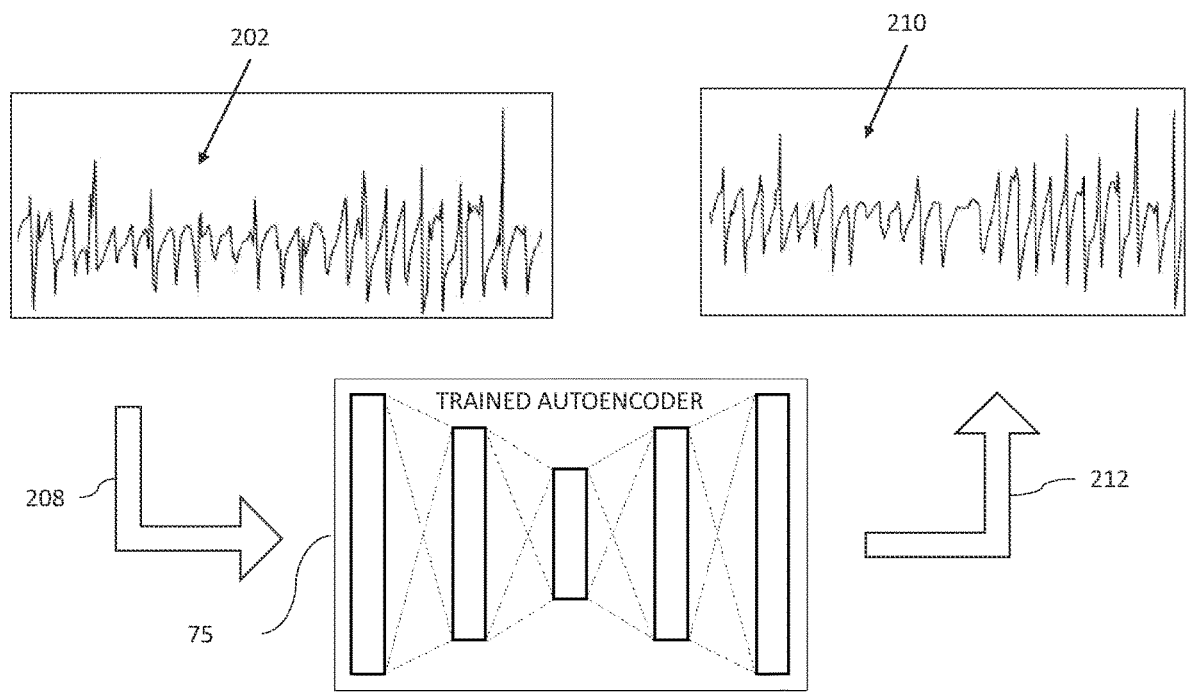
FIG. 10 is a schematic view illustrating processing of the captured signal of FIG. 9 being processed by the trained artificial neural network.

Reference is now made to FIGS. 10 and 11. FIG. 10 is a schematic view illustrating processing of the captured signal 202 of FIG. 9 being processed by the trained artificial neural network 75. FIG. 11 is a flowchart 250 including steps in a method to process the captured signal 202 of FIG. 9 using the trained artificial neural network 75. Reference is also made to FIG. 9.

The catheter 200 is inserted (block 252) in a cardiac chamber of a living subject and/or body surface electrodes 30 are applied to a skin surface of the living subject.

The mapping module 76 running on the processor 68 of the processing circuitry 22 (FIG. 4) is configured to receive (block 254) cardiac signal(s) 202 captured by the sensing electrode(s) 206 (and/or the body surface electrodes 30) in contact with tissue of the living subject (e.g., while the catheter 200 is inserted into the cardiac chamber of the living subject). The cardiac signal(s) 202 are received via the analog-to-digital convertor 71 (FIG. 4), which is configured to convert the cardiac signal(s) 202 from analog to digital form. The mapping module 76 running on the processor 68 of the processing circuitry 22 is configured to apply (block 256, arrow 208) the trained artificial neural network 75 to the cardiac signal(s) 202 to remove noise from the cardiac signal(s) 202 yielding (arrow 212) respective noise-reduced cardiac signal(s) 210.

In some embodiments, the trained artificial neural network comprises the trained autoencoder 77. In these embodiments, the mapping module 76 running on the processor 68 of the processing circuitry 22 (FIG. 1) is configured to apply the autoencoder 77 to the cardiac signal(s) 202 to remove the noise from the cardiac signal(s) 202 yielding the noise-reduced cardiac signal(s) 210.

Reference is now made to FIG. 12, which is a schematic view of a displayed cardiac signal representation 214. Reference is also made to FIG. 11. The mapping module 76 running on the processor 68 of the processing circuitry 22 (FIG. 4) is optionally configured to render (block 258) to the display 29 representation 214 of the noise-reduced cardiac signal(s) 210 (FIG. 10).

Reference is now made to FIG. 13, which is a schematic view of a displayed electroanatomic map 216. Reference is also made to FIG. 11. The mapping module 76 running on the processor 68 of the processing circuitry 22 (FIG. 4) is optionally configured to generate and render (block 260) to the display 29 the electroanatomic map 216 responsively to the noise-reduced cardiac signal(s) 210.

As used herein, the terms "about" or "approximately" for any numerical values or ranges indicate a suitable dimensional tolerance that allows the part or collection of components to function for its intended purpose as described herein. More specifically, "about" or "approximately" may refer to the range of values ±20% of the recited value, e.g. "about 90%" may refer to the range of values from 72% to 108%.

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and sub-combinations of the various features described hereinabove, as well as variations and modifications thereof which would occur to persons skilled in the art upon reading the foregoing description and which are not disclosed in the prior art.

What is claimed is:

1. A method for analyzing signals, comprising:
   receiving first cardiac signals captured by at least one first sensing electrode in contact with tissue of a first living subject undergoing a cardiac medical procedure in a room with operating electrophysiology equipment that generates incident noise, the electrophysiology equipment including at least an ablation power generator, an electrocardiogram monitor and processing circuitry;
   selecting one or more segments of the received first cardiac signals for use as training data;
   injecting the one or more selected segments of the received first cardiac signals into a length of wire, which outputs respective noise-added cardiac signals, the noise-added cardiac signals comprising the one or more selected segments of the received first cardiac signals and noise acquired in the length of wire from the incident noise of the operating electrophysiology equipment in the room;
   inputting the noise-added cardiac signals into an artificial neural network;
   training the artificial neural network by iteratively comparing the output of the artificial neural network and the one or more segments of the received first cardiac signals and adjusting parameters of the artificial neural network until any difference between an output of the artificial neural network and the received one or more segments of the first cardiac signals is minimized;
   receiving second cardiac signals captured by at least one second sensing electrode in contact with tissue of a second living subject, the second living subject being one of the same as or different from the first living subject, the second cardiac signals including noise acquired in the length of wire; and
   removing the noise acquired in the length of wire from the second cardiac signals by applying the trained artificial neural network to the second cardiac signals to yield noise-reduced cardiac signals.

2. The method according to claim 1, further comprising converting the first cardiac signals from a digital form to an analog form, the injecting including injecting the first cardiac signals in the analog form into the length of wire, the method further comprising converting the noise-added cardiac signals to the digital form, the training including training the artificial neural network to remove noise from cardiac signals responsively to the received first cardiac signals in the digital form and the respective noise-added cardiac signals in the digital form.

3. The method according to claim 1, wherein the training comprises training an autoencoder comprising an encoder and a decoder.

4. The method according to claim 1, further comprising rendering to a display a representation of at least one of the noise-reduced cardiac signals.

5. The method according to claim 1, further comprising generating and rendering to a display an electroanatomic map responsively to the noise-reduced cardiac signals.

6. The method according to claim 1, further comprising:
   inserting a first catheter comprising the at least one first sensing electrode into a cardiac chamber of the first living subject; and
   inserting a second catheter comprising the at least one second sensing electrode into a cardiac chamber of the second living subject.

7. The method according to claim 6, wherein the first catheter includes the second catheter.

8. A computer program product, comprising a non-transitory computer-readable medium having computer-readable program code embodied therein to be executed by one or more processors, the program code including instructions to:
   receive first cardiac signals captured by at least one first sensing electrode in contact with tissue of a first living subject undergoing a cardiac medical procedure in a room with operating electrophysiology equipment that generates incident noise, the electrophysiology equipment including at least an ablation power generator, an electrocardiogram monitor and processing circuitry;
   select one or more segments of the received first cardiac signals for use as training data;

inject the one or more selected segments of the received first cardiac signals into a length of wire, which outputs respective noise-added cardiac signals, the noise-added cardiac signals comprising the one or more selected segments of the received first cardiac signals and noise acquired in the length of wire from the incident noise of the operating electrophysiology equipment in the room;

input the noise-added cardiac signals into an artificial neural network;

train the artificial neural network by iteratively comparing the output of the artificial neural network and the one or more segments of the received first cardiac signals and adjusting parameters of the artificial neural network until any difference between an output of the artificial neural network and the received one or more segments of the first cardiac signals is minimized;

receive second cardiac signals captured by at least one second sensing electrode in contact with tissue of a second living subject, the second living subject being one of the same as or different from the first living subject, the second cardiac signals including noise acquired in the length of wire; and remove the noise acquired in the length of wire from the second cardiac signals by applying the trained artificial neural network to the second cardiac signals to yield noise-reduced cardiac signals.

9. The software product according to claim 8, wherein the program code includes further instructions to cause a representation of at least one of the noise-reduced cardiac signals to be rendered to a display.

10. The software product according to claim 8, wherein the program code includes further instructions to generate and cause an electroanatomic map responsively to the noise-reduced cardiac signals to be rendered to a display.

11. A medical system, comprising:
one or more processors; and
a non-transitory computer readable medium storing a plurality of instructions, which when executed, cause the one or more processors to:
receive first cardiac signals captured by at least one first sensing electrode configured to contact tissue of a first living subject undergoing a cardiac medical procedure in a room with operating electrophysiology equipment that generates incident noise, the electrophysiology equipment including at least an ablation power generator, an electrocardiogram monitor and processing circuitry;
select one or more segments of the received first cardiac signals for use as training data;
inject the one or more selected segments of the received first cardiac signals into a first end of a length of wire, which outputs at a second end respective noise-added cardiac signals, the noise-added cardiac signals comprising the one or more selected segments of the received first cardiac signals and noise acquired in the length of wire from the incident noise of the operating electrophysiology equipment in the room;
input the noise-added cardiac signals into an artificial neural network;
train the artificial neural network by iteratively comparing the output of the artificial neural network and the one or more segments of the received first cardiac signals and adjusting parameters of the artificial neural network until any difference between an output of the artificial neural network and the received one or more segments of the first cardiac signals is minimized;
receive second cardiac signals captured by at least one second sensing electrode configured to contact tissue of a second living subject, the second living subject being one of the same as or different from the first living subject, the second cardiac signals including noise acquired in the length of wire; and
remove the noise acquired in the length of wire from the second cardiac signals by applying the trained artificial neural network to the second cardiac signals to yield noise-reduced cardiac signals.

12. The system according to claim 11, wherein the artificial neural network comprises an autoencoder including an encoder and a decoder, the processing circuitry being configured to train the autoencoder to remove noise from cardiac signals responsively to the received first cardiac signals and the respective noise-added cardiac signals.

13. The system according to claim 11, wherein the processing circuitry further comprises:
a digital-to-analog converter configured to convert the first cardiac signals from a digital form to an analog form, the processing circuitry being configured to inject the first cardiac signals in the analog form into the length of wire; and
an analog-to-digital converter configured to convert the noise-added cardiac signals to the digital form, the processing circuitry being configured to train the artificial neural network to remove noise from cardiac signals responsively to the received first cardiac signals in the digital form and the respective noise-added cardiac signals in the digital form.

14. The system according to claim 11, wherein the trained artificial neural network comprises an autoencoder including an encoder and a decoder, the processing circuitry being configured to apply the autoencoder to the second cardiac signals to yield the noise-reduced cardiac signals.

15. The system according to claim 11, further comprising a display, wherein the processing circuitry is configured to render to the display a representation of at least one of the noise-reduced cardiac signals.

16. The system according to claim 11, further comprising a display, wherein the processing circuitry is configured to generate and render to the display an electroanatomic map responsively to the noise-reduced cardiac signals.

17. The system according to claim 11, further comprising:
a first catheter comprising the at least one first sensing electrode, and configured to be inserted into a cardiac chamber of the first living subject; and
a second catheter comprising the at least one second sensing electrode, and configured to be inserted into a cardiac chamber of the second living subject.

18. The system according to claim 17, wherein the first catheter includes the second catheter.

* * * * *